United States Patent
Lee et al.

(10) Patent No.: US 8,857,071 B2
(45) Date of Patent: Oct. 14, 2014

(54) CLOTHES TREATING APPARATUS HAVING HEAT EXCHANGER CLEANING DEVICE

(75) Inventors: Junseok Lee, Changwon-si (KR); Seonil Heo, Changwon-si (KR); Kiwook Jung, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/431,390

(22) Filed: Mar. 27, 2012

(65) Prior Publication Data

US 2012/0246960 A1 Oct. 4, 2012

(30) Foreign Application Priority Data

| Mar. 29, 2011 | (KR) | ......................... 10-2011-0028389 |
| Mar. 29, 2011 | (KR) | ......................... 10-2011-0028390 |
| Mar. 29, 2011 | (KR) | ......................... 10-2011-0028391 |
| Mar. 29, 2011 | (KR) | ......................... 10-2011-0028397 |
| Mar. 29, 2011 | (KR) | ......................... 10-2011-0028398 |

(51) Int. Cl.
*D06F 58/24* (2006.01)
*D06F 25/00* (2006.01)
*D06F 58/20* (2006.01)
*D06F 58/22* (2006.01)

(52) U.S. Cl.
CPC .............. *D06F 58/206* (2013.01); *D06F 58/22* (2013.01)
USPC .................................................. 34/85; 68/20

(58) Field of Classification Search
USPC ...................... 34/72, 73, 79, 83, 85, 130, 134; 68/12.19, 18 C, 18 F, 20; 134/104.1, 134/105, 107, 108, 198, 201
See application file for complete search history.

(56) References Cited

U.S. PATENT DOCUMENTS

| 5,226,203 | A | * | 7/1993 | Sacconato et al. ................ 8/159 |
| 7,055,262 | B2 | * | 6/2006 | Goldberg et al. ................. 34/86 |
| 7,624,470 | B2 | * | 12/2009 | Heyman .......................... 15/301 |
| 7,665,225 | B2 | * | 2/2010 | Goldberg et al. ................. 34/73 |

(Continued)

FOREIGN PATENT DOCUMENTS

| DE | 3738031 A1 | 11/1987 |
| EP | 1 584 734 | 10/2005 |

(Continued)

OTHER PUBLICATIONS

International Search Report dated Oct. 18, 2012.

(Continued)

*Primary Examiner* — Joseph L Perrin
(74) *Attorney, Agent, or Firm* — Ked & Associates, LLP

(57) ABSTRACT

A laundry machine having a heat exchanger cleaning device may include a cabinet, a drum provided in the cabinet, a heat exchanger for heating air to dry laundry in the drum, air conduits to circulate the air between the heat exchanger and the drum, and a control valve that controls a flow of water to the heat exchanger to clean lint deposits on the heat exchanger. An area of the heat exchanger may be divided into a plurality of regions, such that a first nozzle is coupled to the first outlet port and provided above a first region of the plurality of regions and a second nozzle is coupled to the second outlet port and provided above a second region of the plurality of regions. The control valve may selectively direct the flow of water toward the first nozzle or the second nozzle to clean a desired region.

20 Claims, 12 Drawing Sheets

(56) References Cited

U.S. PATENT DOCUMENTS

| | | | |
|---|---|---|---|
| 8,182,612 B2* | 5/2012 | Grunert | 134/34 |
| 8,438,750 B2* | 5/2013 | Dittmer et al. | 34/83 |
| 2005/0204755 A1* | 9/2005 | Nishiwaki et al. | 62/93 |
| 2009/0071033 A1* | 3/2009 | Ahn et al. | 34/595 |
| 2009/0094852 A1* | 4/2009 | Tatsumi et al. | 34/132 |
| 2010/0065087 A1* | 3/2010 | Grunert | 134/19 |
| 2010/0101606 A1 | 4/2010 | Grunert | |
| 2010/0192397 A1* | 8/2010 | Kim et al. | 34/73 |
| 2010/0192398 A1* | 8/2010 | Ahn et al. | 34/79 |
| 2010/0212369 A1 | 8/2010 | Grunert et al. | |
| 2011/0277334 A1* | 11/2011 | Lee et al. | 34/73 |

FOREIGN PATENT DOCUMENTS

| | | | |
|---|---|---|---|
| GB | 2087029 A | * | 5/1982 |
| KR | 10-2010-0032227 A | | 3/2010 |
| KR | 10-2011-0019095 A | | 2/2011 |
| KR | 10-2011-0059993 A | | 6/2011 |
| RU | 25010 | | 9/2002 |

OTHER PUBLICATIONS

Russian Decision to Grant a Patent issued in related Application No. 2013147992/12 dated Jul. 15, 2014.

* cited by examiner

CLOTHES TREATING APPARATUS HAVING HEAT EXCHANGER CLEANING DEVICE

CROSS-REFERENCE TO RELATED APPLICATION(S)

This application claims priority under 35 U.S.C. §119 to Korean Application No. 10-2011-0028389, 10-2011-0028391, 10-2011-0028398, 10-2011-0028397 and 10-2011-0028390 filed in Korea on Mar. 29, 2011, which is hereby incorporated by reference for all purposes as if fully set forth herein.

BACKGROUND

1. Field

A laundry machine having a heat exchanger cleaning device is disclosed herein that removes lint build on a surface of an evaporator.

2. Background

Laundry machines having heat exchanger cleaning devices are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

A laundry machine with a drying function may remove moisture by supplying hot air into a drum while an object to be dried is put into the rotating drum. The laundry machine may be a clothes treating apparatus and may include a dryer or a washer and dryer. The hot air supplied to the drum may be generated using electrical or natural gas based heat sources. However, for the purpose of reducing energy consumption, heat pumps may be used to heat the air.

For example, high temperature air exhausted from the drum may be cooled and condensed through heat exchange with an evaporator, and air being supplied to the drum may undergo heat exchange with a condenser to generate hot air. By using heat pumps, heat discarded during exhaust or condensation may be reused for generation of hot air to reduce energy consumption.

However, as described above, since air that passes through the evaporator first comes into contact with the laundry before being exhausted, the air may contain a large amount of lint. In order to reduce the amount of lint, a lint removal filter may be installed before the evaporator in the hot air exhaust passage, thereby preventing lint from being exhausted to the outside or flowing into the evaporator to some extent.

In order to improve lint removal, openings in the mesh of the lint filter (or mesh size) may be reduced. However, this may increase flow resistance in the air passage to reduce exhaust efficiency, and thus, reduction in size of the mesh is limited. As a result, some of the lint may pass through the lint removal filter and may flow into the evaporator. The lint flowing into the evaporator may then attach to the surface of the evaporator to reduce heat exchange efficiency and increase flow resistance.

To solve these problems, various attempts have been made to remove lint build up on the surface of the evaporator. In one example, the laundry machine may remove lint by spraying condensation water, generated through condensation from the evaporator, onto the surface of the evaporator. However, the amount of water from condensation may not always be sufficient. Thus, lint removal may be difficult when the amount of available condensation water is small. Even when the amount of condensation is sufficient, a high-capacity pump may be required to evenly spray condensation water, sprayed through nozzles, onto the surface of the evaporator.

The increase in capacity of the pump may lead to an increase in power consumption as well as an increase in the overall size of the washing machine, and hence, limit where the washing machine can be installed.

Therefore, the laundry machine as broadly described and embodied herein includes a heat exchanger cleaning device that may remove lint build up on a surface of a heat exchanger even when condensation water is insufficient. The laundry machine having the heat exchanger cleaning device may remove lint across an entire front surface of the heat exchanger while using a small capacity pump.

Figure 1:
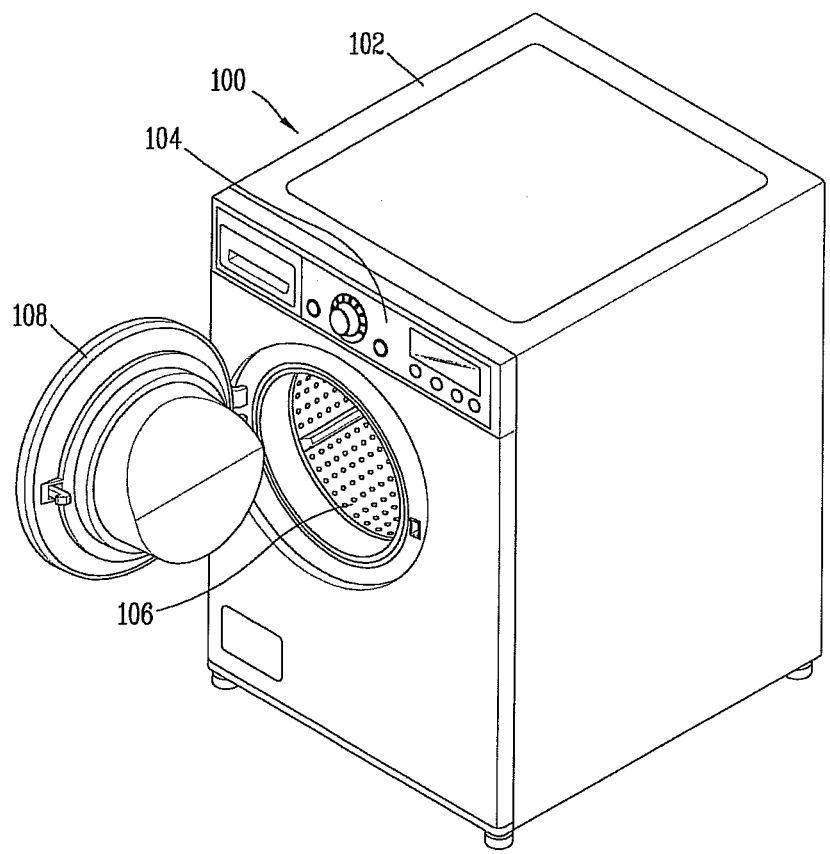
FIG. 1 a perspective view of a clothes treating apparatus having a heat exchanger cleaning device according to an exemplary embodiment of the present disclosure.
Figure 2:
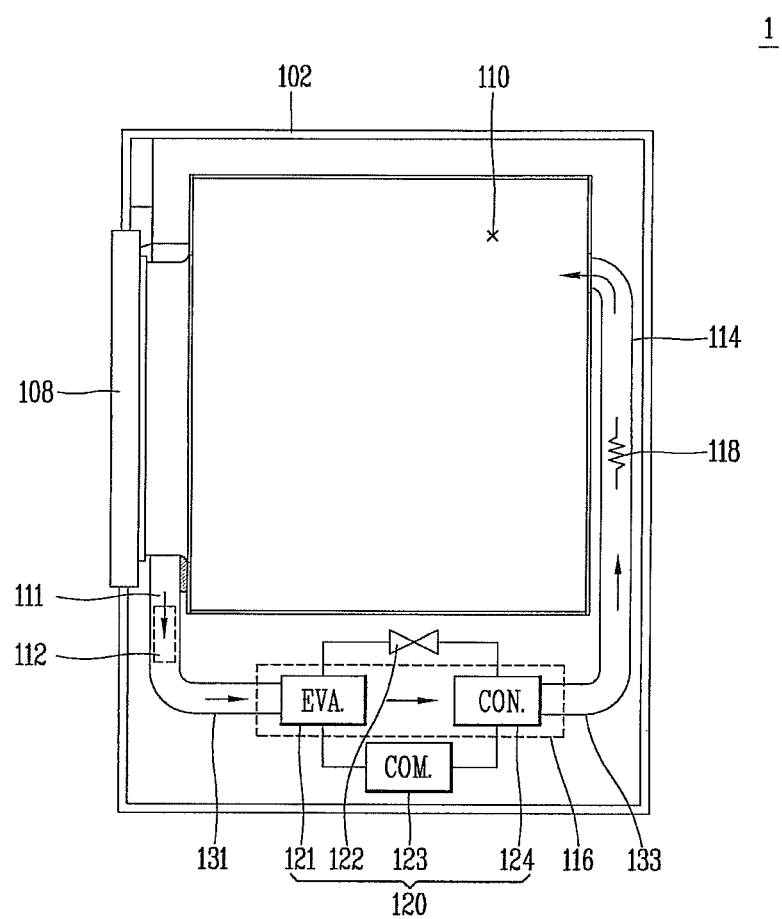
FIG. 2 is sectional view schematically illustrating the internal structure of the clothes treating apparatus of FIG. 1.

FIG. 1 is a perspective view illustrating a laundry machine having a heat exchanger cleaning device according to an embodiment of the present disclosure. FIG. 2 is an internal structural view schematically illustrating the internal structure of the laundry machine 1 of FIG. 1. Here, the laundry machine 1 of FIG. 1 is a dryer, but the present disclosure is not limited thereto. The present disclosure is applicable to any type of laundry machine 1 or clothes treating apparatus with a drying function that dries laundry placed in a drum by supplying hot air such as a washing machine having a dryer or a stand alone dryer.

With reference to FIGS. 1 and 2, the laundry machine 1 according to the embodiment as shown in FIG. 1 includes a cabinet 100 which may have substantially rectangular parallelepiped shape. The cabinet 100 may have a top plate 102 on a top surface thereof and a control panel 104 at the top of a front surface thereof that controls various functions of the dryer and which may display an operating status. An opening 106 may be formed in the front surface of cabinet 100 to put items to be dried (e.g., clothes), through the opening 106. A door 108 may be installed adjacent to the opening 106 to open or close the opening 106.

A drum 110 is rotatably installed inside the cabinet 100 so that laundry is put into the drum 110. In addition, a lint filter 112, through which air exhausted from the drum 110 may flow, may be formed around the lower part of the front surface of the drum 110. The lint filter 112 may include filter material (e.g., mesh) which filters lint from the air flow as well as form a portion of the flow path through which hot air circulates.

A circulation flow path 116 may be provided downstream of the lint filter 112, and a heat pump 120 may be installed inside the circulation flow path 116. Specifically, the heat pump 120 may include an evaporator 121, an expander 122, a compressor 123, and a condenser 124. The evaporator 121 and the condenser 124 may be installed in the circulation flow path 116, while the expander 122 and the compressor 123 may be arranged outside the circulation flow path 116. Therefore, as air that flows in from the lint filter 112 passes through the circulation flow path 116, the air may sequentially flow through the evaporator 121 and the condenser 124, so that cooling (condensation) and re-heating are performed.

During the above-described cooling process, moisture in the hot air may be condensed to form droplets of condensed water on the surface of the evaporator or drip from the evaporator 121 for collection. The condensation water generated in this manner may be primarily collected in a condensation water collection portion located under the evaporator 122. The condensation water collection portion will be described below.

A back duct 114 may be formed downstream of the circulation flow path 116. The back duct 114 is connected such that the hot air flowing in from the circulation flow path 116 can be re-supplied to the drum 110. In addition, an auxiliary heater 118 may be installed inside the back duct 114 to re-heat the hot air that is primarily heated by the condenser 124. The auxiliary heater 118 may be used to prevent a reduction in the temperature of hot air during an initial stage of the heat pump 120 operation during which the heat pump may not provide a sufficient amount of heat. The auxiliary heater may also be used to reduce drying time by providing an additional quantity of heat to supplement the heat generated by the heat pump 120.

As shown in FIGS. 1 and 2, the laundry machine 1 according to the embodiment as shown in FIG. 1 may be a "circulation type" dryer in which hot air exhausted from the drum is cooled, re-heated, and then flows into the drum again. However, the present disclosure is not limited to the "circulation type" dryer, but is applicable to an "exhaust type" dryer in which the hot air exhausted from the lint filter 112 passes through the evaporator 121 alone, is cooled and condensed, and is then exhausted to the outside of the cabinet 100 without passing through the condenser 124.

Figure 3A:
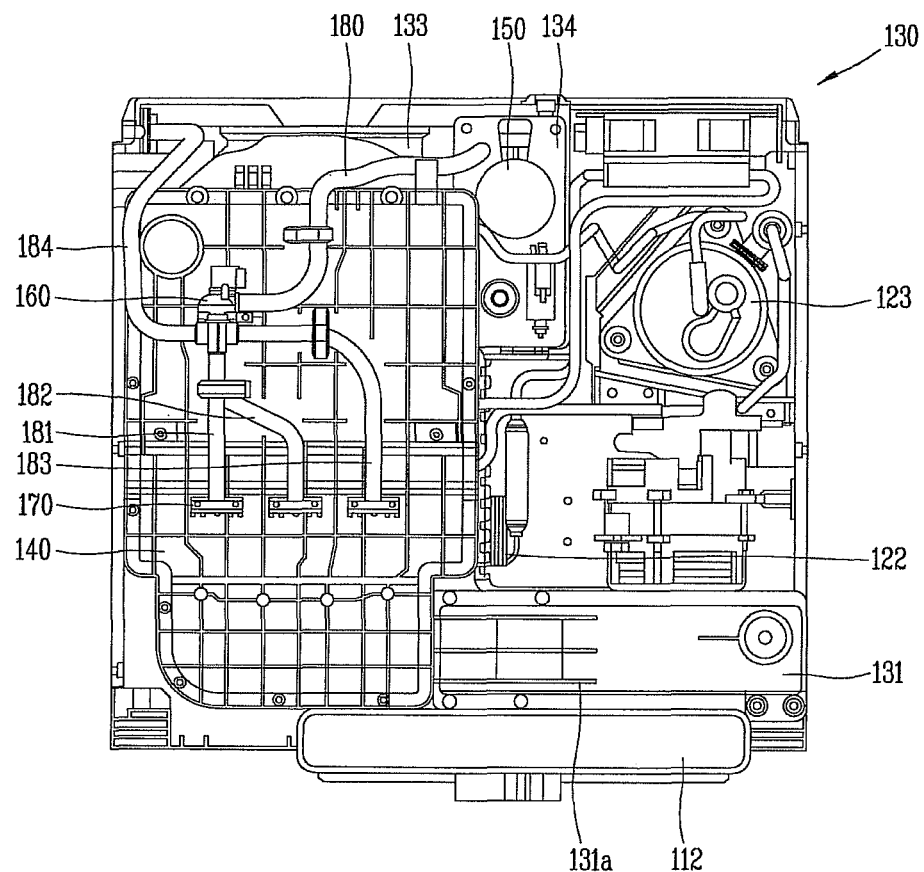
FIG. 3A is a plan view of a base of the clothes treating apparatus of FIG. 1.
Figure 3B:
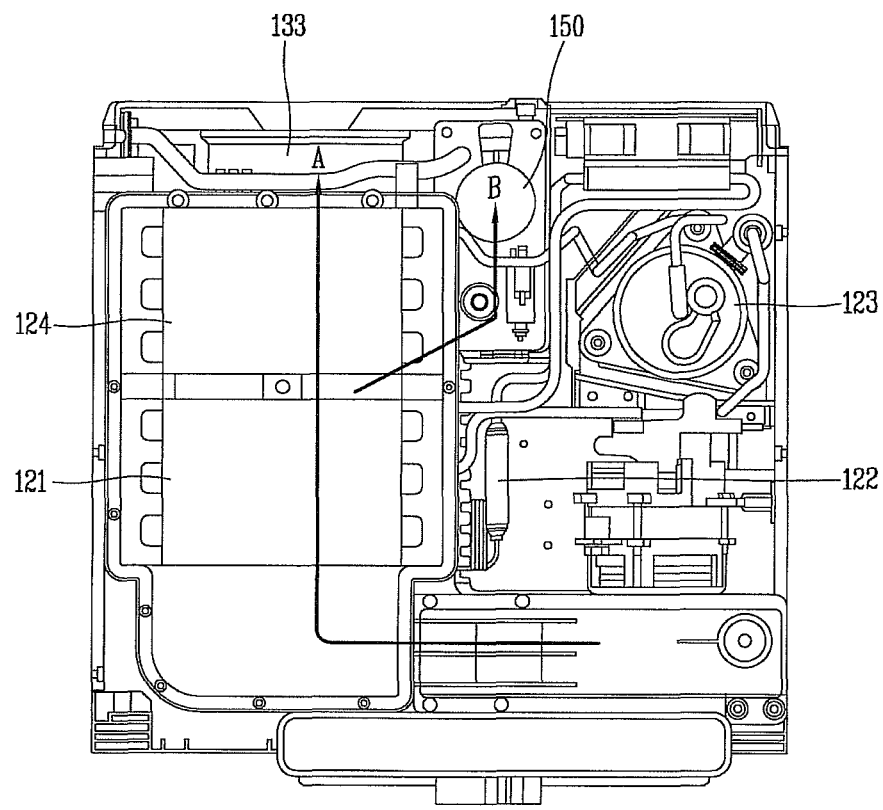
FIG. 3B is a plan view of a base of the clothes treating apparatus of FIG. 1 without a cover plate.
Figure 4:
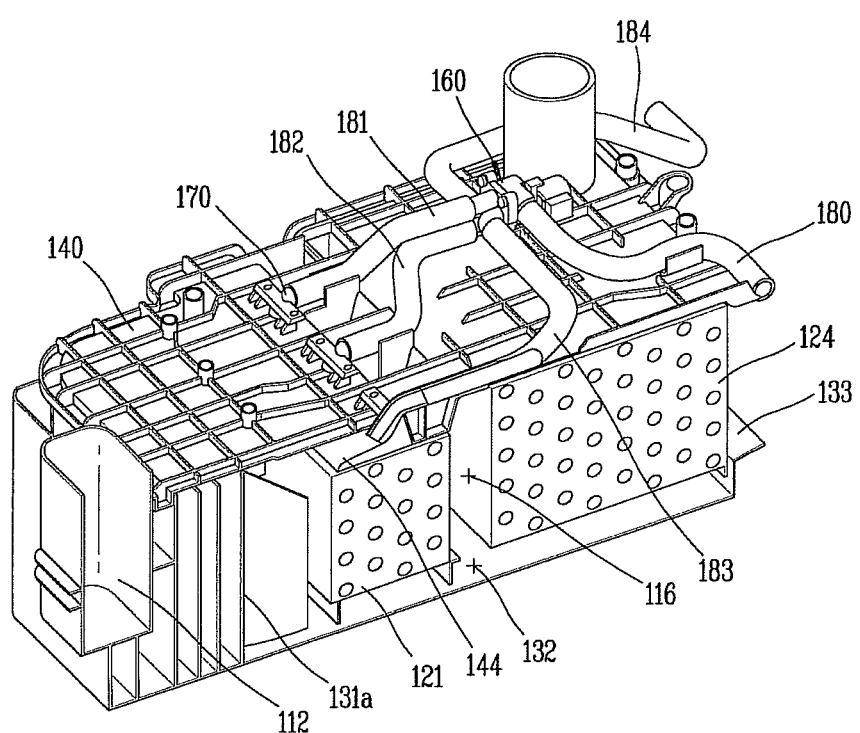
FIG. 4 is a partial cut-away view of the base of FIG. 3.

FIG. 3A is a plan view of a base of the laundry machine 1 of FIG. 1. FIG. 3B is a schematic view of the base of FIG. 3A. FIG. 4 is a partial cut-away view of the base of FIG. 3A. With reference to FIGS. 3A and 4, a base 130 is provided at a bottom surface of the cabinet 100. The base 130 may form a portion of the circulation flow path 116 (conduit), and may provide a space in which the heat pump 120 may be stably supported. Specifically, the circulation flow path 116 in which the evaporator 121 and the condenser 124 are installed may be provided at the left side of the base, and the expander 122 and the compressor 123 may be provided at the right side of the base, as illustrated in FIG. 3.

Referring to FIG. 3B, air may be circulated through the heat exchanger through the circulation flow path 116, as illustrated by the dotted lines. For example, the air may flow from the lint filter 112 through the circulation flow path guide unit 131, then through the front surface of the evaporator 121. Moisture may be condensed from the air at the front surface of the evaporator 121 and collected in the condensation water collection portion 132. The air may then flow through the evaporator 121 and the condenser 124 as indicated by an arrow A. The flow path 116 may be enclosed by partitions or walls to form the conduits. The air may then be reintroduced into the drum through back duct connection unit 133.

The lint filter 112 may be provided at a front part (lower part in FIG. 3) of the cabinet 100, and the circulation flow path guide unit 131 that communicates with the lint filter 112 may be provided. The circulation flow path guide unit 131 communicates with the lint filter 112 and guides the hot air exhausted from the drum 110 to the evaporator 121. To this end, a plurality of guide veins 131a may be formed in the circulation flow path guide unit 131 to guide air to the evaporator 121.

The hot air guided by the guide veins 131a flows into the circulation flow path 116. The circulation flow path 116 may be defined by a cover plate 140 that covers a top part of a space formed by the bottom surface of the base 130 and a partition (not shown) formed on the base 130. That is, the circulation flow path 116 may be a conduit that is formed by the cover plate 140 and the partition of the base 130. Air that passes through the circulation flow path 116 passes through the evaporator 121 and the condenser 124 and flows into the back duct 114 through a back duct connection unit 133 that is formed at a rear surface of the base 130.

The bottom surface of the base 130, on which the evaporator 121 and the condenser 124 are arranged, may serve as a condensation water collection portion 132. That is, the condensation water generated through condensation by the evaporator 121 is primarily collected in the condensation water collection portion 132. The collected condensation water may flow into a condensation water storage portion 134 that is arranged adjacent to the compressor 123. The condensation water collection portion 132 and the condensation water storage portion 134 may be separated from each other by a partition and may communicate with each other through holes formed in the partition.

Therefore, when a level of the condensation water collected in the condensation water collection portion 132 becomes higher than a predetermined level, the condensation water may flow into the condensation water storage portion 134 through the holes and stored therein. The condensation water stored in the condensation water storage portion 134 may be supplied to a control valve 160 that is installed at the upper part of the cover plate 140 using a pump 150. The pump 150 may be provided in the condensation water storage portion 134, as described in further detail hereinafter.

Referring to FIG. 3B, arrow B indicates a moving path of condensation water on the bottom surface of the body. That is, condensation water collected in the condensation water collection portion 132 below the evaporator and the condenser moves to the direction indicated by the arrow B, thus to move to the condensation water storage portion 134 formed to be lower than the condensation water collection portion 132. A pump mounting portion 135 for mounting the pump 150 is formed at the condensation water storage portion 134.

Figure 5:
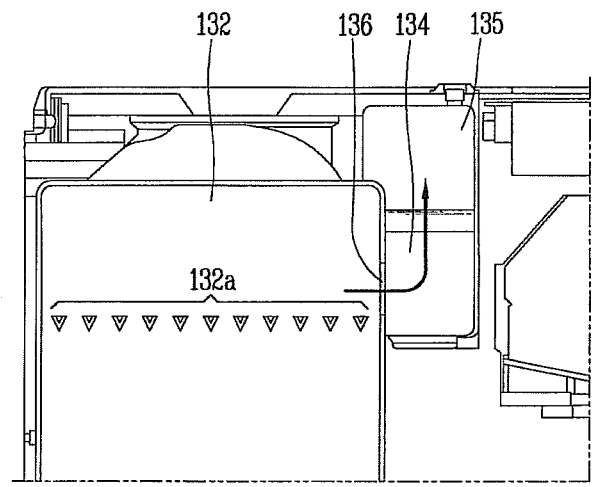
FIG. 5 is an enlarged partial plan view of the base of FIG. 3.

FIG. 5 is a planar view showing the condensation water collection portion and a sump in a state where all the equipment of FIG. 3B has been removed. The arrow of FIG. 5 indicates a moving path of condensation water. The condensation water storage portion 134 and the condensation water collection portion 132 are partitioned from each other by a wall body. The condensation water may be introduced into the sump through a sump inlet 136 of the wall body, and move to the pump mounting portion.

Figure 6:
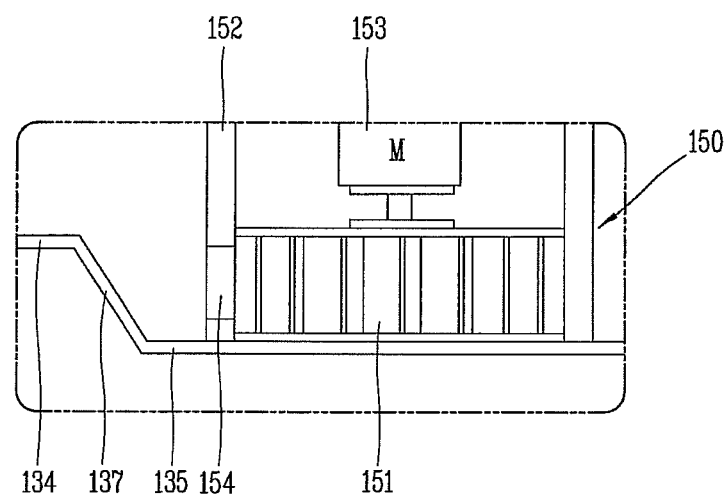
FIG. 6 is a partial cross sectional view of the base of FIG. 3.

As aforementioned, the pump mounting portion 135 of the condensation water storage portion 134 is formed to be lower than the condensation water storage portion 134. Referring to FIGS. 5 and 6, the pump mounting portion 135 and the condensation water storage portion 134 are formed in a stair shape.

The pump 150 includes a case 152, and an impeller 151 provided at a lower part of the case and transferring water. A motor 153 for rotating the impeller is provided in the case, and transfers a rotational force. Under this configuration, condensation water introduced through an impeller side inlet 154 of the case is pressed by the impeller. The pressed condensation water upward moves, and moves along a flow path provided in the case.

Referring to FIG. 6, the impeller side inlet of the case is positioned close to the bottom surface of the pump mounting portion 135, so that the lower end of the impeller is located at a lower position than the condensation water storage portion 134. Under this configuration, the introduced condensation water can be smoothly introduced to the pump, and the amount of the condensation water which remains in the sump can be minimized.

And, the pump mounting portion 135 has an inclination surface 137 inclined with respect to the condensation water storage portion 134. Due to the inclination surface 137, the condensation water introduced into the sump 112 can smoothly move to the pump mounting portion 135.

Figure 7:
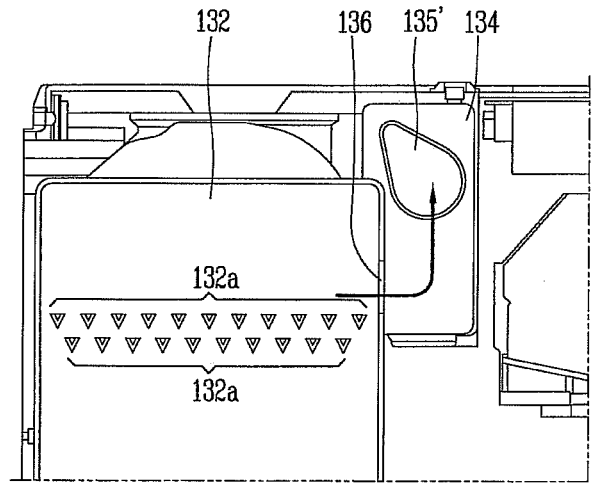
FIG. 7 is an enlarged partial plan view of another example of the base of FIG. 3.

FIG. 7 illustrates a modification example of the pump mounting portion 135. Referring to FIG. 7, the pump mounting portion 135' is formed to have a shape of the bottom surface of a pump case. That is, part of the sump is concaved in correspondence to the shape of the bottom surface of the pump case. More specifically, the pump mounting portion 135' of FIG. 6 has a shape protruding from a circle.

Generally, the pump is formed to have a circular shape. Accordingly, the pump is not disposed at the protruding portion, and thus a larger amount of condensation water is collected in the protruding portion of the pump mounting portion 135' than in other parts. As a result, a sufficient amount of water can be supplied to the impeller. A foreign material removing portion 132a is formed at the condensation water collection portion 132. The foreign material removing portion 132a includes a plurality of ribs upward protruding from the bottom surface of the condensation water collection portion.

More specifically, the ribs are formed in a wedge shape such that an upstream side sectional surface of a path of the condensation water is smaller than a downstream side sectional surface. Under this configuration, the condensation water can pass through the space between the ribs, whereas foreign materials having a large size which may influence on the pump, etc. cannot pass therethrough. Especially, foreign materials of a large size such as lint can be filtered by the ribs.

Referring to FIG. 7, the foreign material removing portion 132a is arranged in two columns. At least two columns of the ribs are arranged to cross each other. This may allow foreign materials to be removed more effectively.

Figure 8:
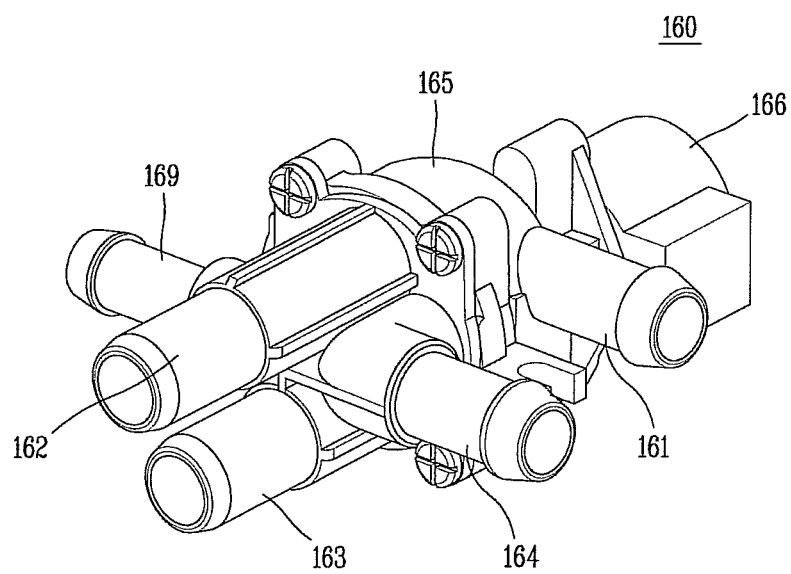
FIG. 8 is a perspective view of a control valve.
Figure 9:
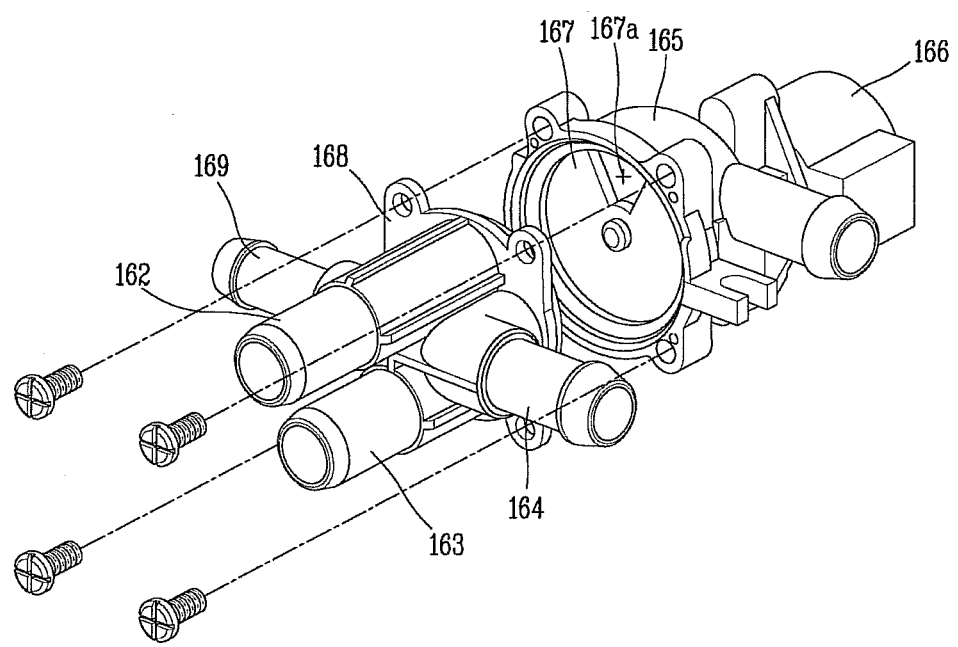
FIG. 9 is an exploded perspective view of the control vale of FIG. 8.

With reference to FIGS. 8 and 9, the condensation water that is supplied through a water pipe 180 that is connected between a discharge hole of the pump 150 and an inlet port 161 of the control valve 160 is connected to a plurality of water supply ports 162, 163, and 164 and a draining port 169 which are provided on the control valve 160. The inlet port 161 may be provided on a valve case 165 that has a control disk 167 therein. The water supply ports 162, 163, and 164 and the draining port 169 may be provided on a port portion 168 that is engaged with the valve case 165. The control disk 167 may be rotatably mounted by a motor 166 that is provided at one end of the valve case 165 and may include a cut portion 167a.

In addition, the water supply ports 162, 163, and 164 and the draining port 169 may be arranged radially at predetermined intervals, for example, at 90° intervals, on the port portion 168. Therefore, a path of the condensation water supplied through the inlet port 161 may be determined according to the position of the cut portion 167a. As shown in FIG. 9, the condensation water may be drained through the water supply port 162. The position of the cut portion 167a may be controlled by a controller.

Figure 10:
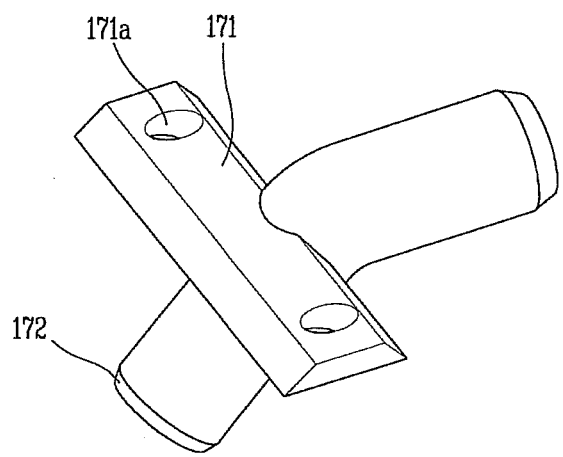
FIG. 10 is a perspective view of a spay pipe.
Figure 11:
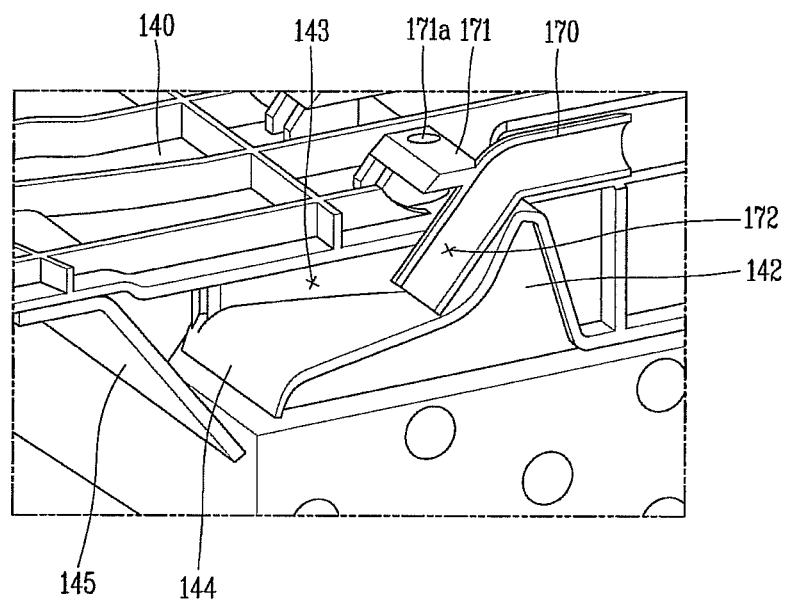
FIG. 11 is partial cut-away view showing an installed spray pipe of FIG. 10.

The condensation water that passes through the control valve 160 may pass through three water pipes 181, 182, and 183 and supplied to an injection pipe 170. With reference to FIGS. 10 and 11, the injection pipe 170 may have a bent central portion and may include an engagement unit 171 (mounting bracket) integrally formed to extend along both sides. The engagement unit 171 may be shaped into a flat panel that extends in one direction and has engagement holes 171a (mounting holes) formed at both ends thereof so that the engagement unit 171 and the cover plate 140 may be joined using bolts. The engagement unit 171 may be configured such that a position of the injection pipe 170 may be adjusted relative to the front surface of the evaporator 121.

A discharge opening 172 of the injection pipe 170 may be placed through the cover plate 140 to protrude below the bottom surface of the cover plate 140. In addition, diffusers 142 may be positioned at the bottom surface of the cover plate 140 to form a path for the condensation water discharged from the discharge opening 172 of the injection pipe 170.

Here, as shown in FIGS. 10 and 11, the diffuser 142 may be formed integrally with the cover plate 140. Alternatively, the diffuser 142 may be formed as a separate component that is fixed to the bottom surface of the cover plate 140. A diffuser 142 may be provided for each of the injection pipes 170 corresponding to each of the water pipes 181, 182, 183.

A channel 143 may be formed by the diffuser 142 to serve as a flow path through which the sprayed condensation water may flow. The width of the channel 143 may be increased toward an outlet 144. In addition, the outlet 144 of the channel 143 may be bent downward toward the front surface (e.g., a surface that faces the airflow) of the evaporator 121. Therefore, the flow of the condensation water discharged through the injection pipe 170 may be stabilized while the condensation water flows along the channel 143 of the diffuser 142. The condensation water may then drop toward the front surface of the evaporator 121 conforming to the shape of the outlet 144. That is, since the velocity of the condensation water may be high immediately after the condensation water is discharged from the injection pipe 170 due to the pressure of the pump 150, a large amount of water may be scattered due to collisions with the wall surface.

When the amount of condensation water that flows through the channel 143 becomes large, greater amounts of condensation water may be wasted and the portion of the condensation water that is guided to the front surface of the evaporator 121 may be reduced. Therefore, the velocity of condensation water that flows through the diffuser 142 may be reduced and stabilized prior to supplying the condensation water to the evaporator 121, thereby maximizing the supplied condensation water at the evaporator 121.

In order to stabilize the flow of water, a sufficient length of the channel 143 of the diffuser 142 may be necessary. In certain cases, as the length of the channel 143 may be insufficient to stabilize the water flow, a guide plate 145 may be provided that redirects scattered water toward the front surface of the evaporator 121. The guide plate 145 may be arranged separately from the outlet 144 and provided at the lower surface of the cover plate 140. The guide plate 145 may be inclined downward toward the front surface of the evaporator 121. Hence, even when some of the condensation water discharged through the outlet 144 is scattered, the scattered condensation water may be redirected to the front surface of the evaporator 121 by the guide plate 145.

In one embodiment, the position of the injection pipes 170 relative to the diffuser 142 may be adjustable to control the length of the channel and the flow of water through the channel. For example, the engagement unit 171 may be slidably attached to the cover plate 140 to provide adjustability. Moreover, a housing may be provided over the front surface of the evaporator 121 to further contain the flow of water over the front surface.

Here, a range in which the condensation water discharged by each of the diffusers 142 reaches the evaporator 121 may be smaller than the entire area of the evaporator 121 that requires cleaning. Therefore, the condensation water sprayed by one diffuser 142 may reach a partial area of the evaporator 121 but not the entire area of the evaporator 121. However, the condensation water sprayed by the three diffuser 142 reach different areas as shown in the drawings. Therefore, it may be difficult to clean the entire area of the evaporator 121 using one diffuser 142, but it is possible to clean the entire area of the evaporator 121 by adding up the ranges in which the condensed water is sprayed by the individual diffusers 142.

Here, the entire area of the evaporator 121 as referred to herein does not necessarily refer to the entire front surface of the evaporator 121. It should be appreciated that the entire area may also include other areas on which lint from the hot air may be deposited and requires cleaning.

Meanwhile, when the amount of condensation water that is stored in the condensation water storage portion 134 is greater than a prescribed amount, the condensation water may be drained to maintain a desired level. A water level sensor may be provided to detect the level of condensation water. When the sensor detects the level of condensation water in the condensation water storage portion 134 to exceed the prescribed amount, the condensation water may be drained through the draining port 169 of the control valve 160 by using the pump 150. The condensation water drained in this manner may be drained outside the cabinet 100 through a draining pipe 184, thereby controlling the amount of condensation water in the condensation water storage portion 134.

Figure 12:
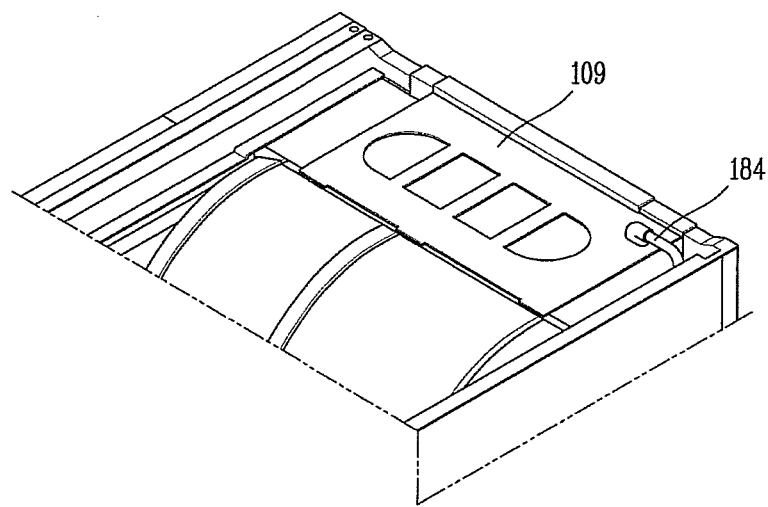
FIG. 12 is a partial perspective view of a water reservoir.
Figure 13:
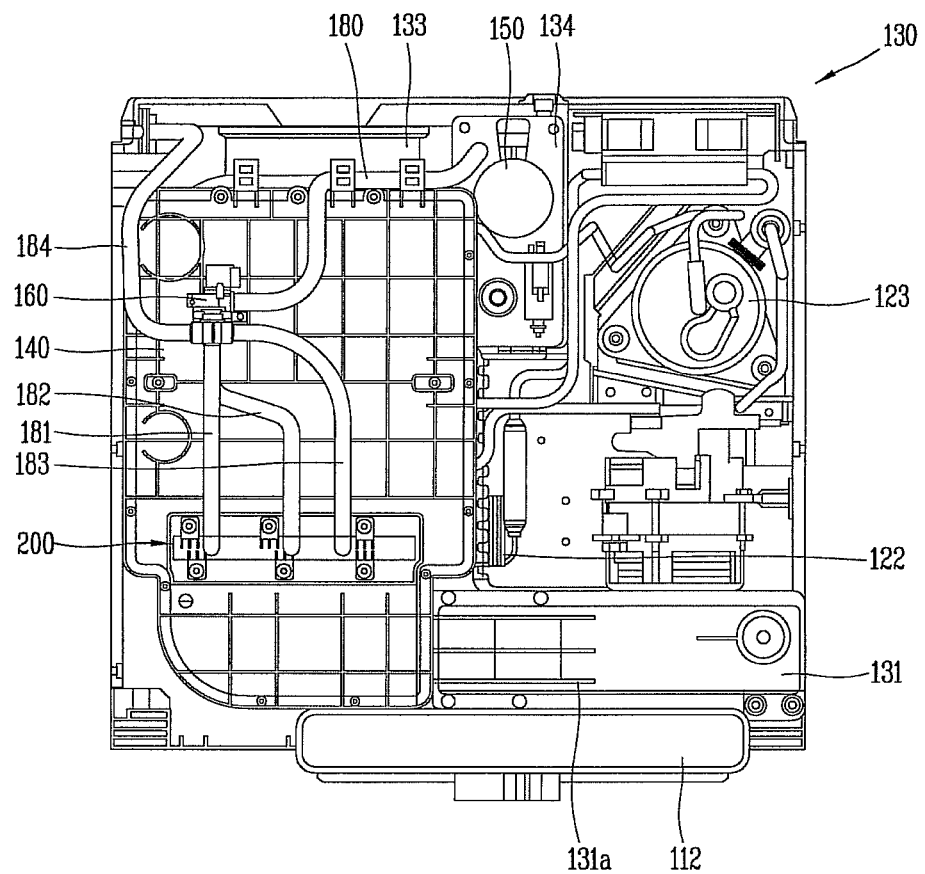
FIG. 13 is a plan view of a base of a clothes treating apparatus having a heat exchanger cleaning device according to another exemplary embodiment of the present disclosure.
Figure 14:
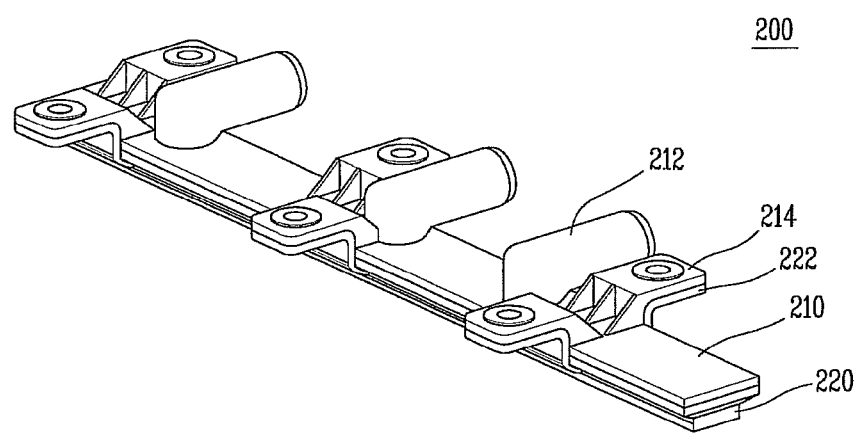
FIG. 14 is a perspective view of a spray nozzle.
Figure 15:
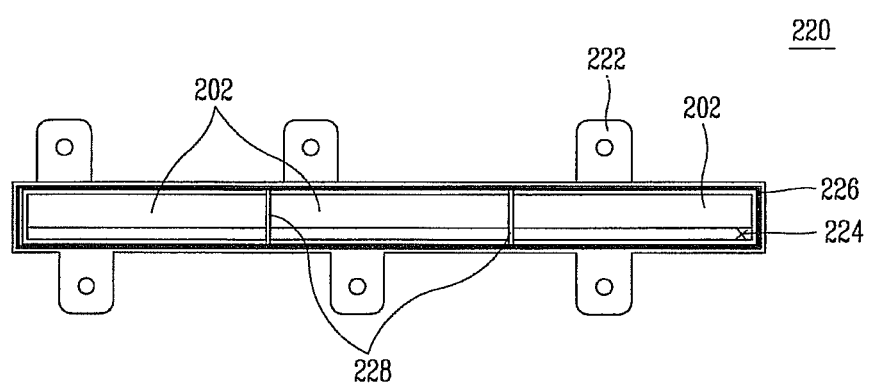
FIG. 15 is a plan view of an upper member of the spray nozzle of FIG. 14.
Figure 16:
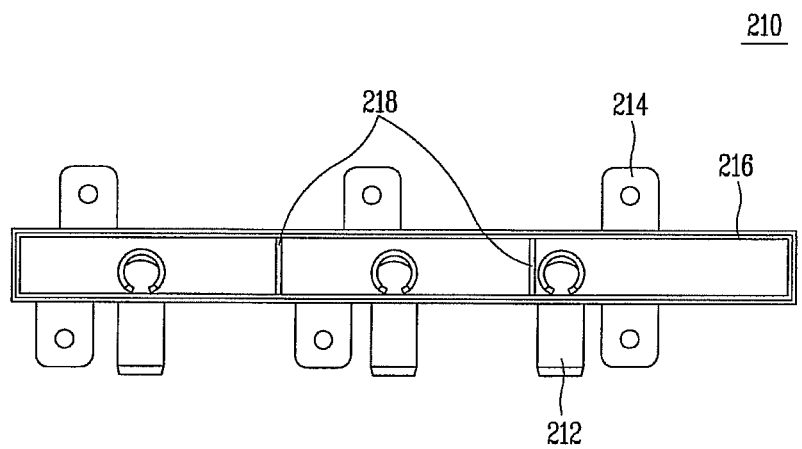
FIG. 16 is a plan view of a lower member of the spray nozzle of FIG. 14.

However, drainage outside the cabinet 100 may not be possible unless a drainage system such as a sewer is provided at a place where the laundry machine 1 is installed. As shown in FIG. 12, a condensation water reservoir 109 may be provided at an upper region of the cabinet 100 to store condensation water. The draining pipe 184 may be connected to the condensation water reservoir 109 so that the condensation water can be stored in the condensation water reservoir 109. The condensation water stored in the condensation water reservoir 109 may be emptied by a user or used when additional condensation water is needed. Moreover, in one embodiment, an external water source may be provided to supply additional water to the condensation water storage portion 134. For example, when the amount of condensation collected from the evaporator 121 is insufficient (e.g., as sensed by the water level sensors), water may be provided through the external water source.

The pump 150 may pump water from the condensation water storage portion 134 to the water supply ports 162, 163, 164 or to the draining port 169. The pump 150 may be positioned in the condensation water storage portion 134. The pump 150 may be immersed in the water and may require a minimum level in the condensation water storage portion 134. A water level sensor may be provided in the condensation water storage portion 134 as well as the condensation water collection portion 132. The water level sensors may sense whether a sufficient amount of water is present to clean the surfaces of the evaporator, or whether too much condensation water is present to drain the excess water.

A controller may be provided to control the cleaning cycles for the evaporator 121. The controller may control the cleaning cycles based on the sensed water levels. For example, when insufficient condensation water is sensed, the cleaning cycles may be adjusted to lengthen the time periods in between cleaning cycles, reduce the duration of water flow during each cleaning cycle, or limit cleaning to a particular region of the evaporator 121 surface (e.g., alternate regions to which water is supplied during each cleaning cycle).

Moreover, the pump 150 may provide water pressure and flow rate which is greater or less than, for example, water supplied through gravity. That is, a water reservoir (e.g., overflow reservoir 109) may be used to provide water to control valve 160. The reservoir 109 may be positioned at a height higher than the evaporator 121 and may rely on gravity for water flow. However, the gush of water or sudden flow of water based on gravity may be limited. The pump 150 may provide water flow rate which is greater or less than that achieved through gravity. The pump 150 may be optimized for capacity as well as physical size. However, because the amount, duration and location of water flow onto the surface of the evaporator 121 may be controlled as described above, a smaller pump 150 may be necessary.

In one embodiment, the controller may control the cleaning cycles based on an amount of lint build up sensed on the surface of the evaporator 121. For example, air flow sensors may be provided at different regions of the front surface of the evaporator 121. The sensed air flow may correspond to an amount of link that has accumulated on the evaporator 121. The controller may use the sensed air flow to determine the cleaning cycle of the evaporator, including the particular region, duration and pattern of the cleaning cycle.

The operation of the embodiment of FIG. 1 will now be described. When lint collected on the surface of the evaporator needs to be removed, a controller detects the amount of condensation water stored in the condensation water storage portion 134. When the amount of condensation water detected is greater than a minimum amount necessary to clean the evaporator, the condensation water may be sprayed onto the surface of the evaporator by operating the pump or the control valve. Here, the control valve may control the condensation water supplied by the pump to be sequentially sprayed through the individual diffusers while sequentially rotating the control disk.

That is, by the rotation of the control disk, the water supply ports or the draining port facing the cut portion communicates with the inlet port, and the condensation water is discharged from the control valve through the corresponding port. The discharged condensation water is sprayed onto the surface of the evaporator by the injection pipe and the diffuser, part of the evaporator that is located within a spray range of the condensation water is cleaned by the sprayed condensation water. Therefore, as the condensation water is sequentially sprayed by the individual diffusers, the surface of the heat exchanger may be cleaned correspondingly, for example, at a predetermined period of time.

Here, the number of injection pipes spraying the condensation water at the same time may be varied according to the number of cut portions formed in the control disk. That is, when three cut portions are formed, condensation water is sprayed by two diffusers at the same time. The number of cut portions may be determined according to the capacity of the pump and purpose of the dryer.

The control valve may selectively control the flow of water to the desired injection pipe 170 and diffuser 142. When the amount of condensation water is determined to be insufficient to clean the entire front surface of the evaporator, the controller may selectively direct water to a particular diffuser based on previous cleaning cycles. For example, the controller may store in a memory the order and duration of water flow through the diffusers. Once a sufficient amount of water is available, water may be directed to a particular diffuser based on the stored information, e.g., a diffuser for a region which may need cleaning the most. In one embodiment, a sensor may be provided to sense the lint deposit on the front surface of the evaporator 121, such as an air flow sensor at the plurality regions of the front surface for each of the diffusers. Hence, the area to be cleaned may be determined based on the amount of lint deposit.

On the other hand, instead of spraying the condensation water onto a partial area of the evaporator when the amount of condensation water is insufficient to clean the entire area of the evaporator, the entire area of the evaporator may be cleaned by controlling the quantity of condensation water sprayed to each of the diffusers. For example, the amount of water sprayed through each diffuser may be reduced based on the amount of condensation water that is available. In this embodiment, the evaporator 121 may be cleaned by condensation water alone. External supply such as water supply may also be used. When an inlet port is added to the control valve, and external supply is connected to the inlet port, or an additional water pipe branching from off the water pipe connected to the inlet port, the evaporator can be cleaned with water being supplied from the external supply. The external water supply may also be connected to the water storage portion 134.

Here, in order to control water supply from the external supply, an on/off valve capable of cutting off a flow path may be installed at the water pipe connected to the external supply. When condensation water is sufficient, cleaning is performed only with the condensation water. When condensation water is not sufficient, the on/off valve is opened to allow the use of water from the external supply along with the condensation water.

FIGS. 13 to 17 show a laundry machine having an heat exchanger cleaning device according to another embodiment. The nozzle configuration of this embodiment is different from the nozzle configuration of the embodiment of FIG. 1. The laundry machine of this embodiment includes many features which are the same or similar to the embodiment of FIG. 1, in which like reference numerals denote like elements. Simply for ease of description, repetitive description of common features previously described are omitted hereinafter.

In this embodiment, a spray nozzle 200 may include three water supply ports 212 and three spray chambers 202 that communicate with the water supply ports 212. Specifically, the spray nozzle 200 may include an upper member 210 on which the three water supply ports 212 are formed and a lower member 220 that is engaged with the upper member 210 and has the three spray chambers 202 therein. The spray nozzle 200 may be engaged with the cover plate 140 by two engagement units 214 and 222 that extend from both ends of the upper member 210 and the lower member 220. In one embodiment, the engagement units 214 and 222 may be mounting brackets. Moreover, the spray nozzle 200 may be configured such that the position of the spray nozzle 200 relative to the front surface of the evaporator 121 may be adjustable.

The lower member 220 may have a cavity therein, and the cavity may be divided into the three spray chambers 202 by a partition 228 provided in the cavity. Also, a recessed portion 226 may be provided along the edge of the lower member 220. The recessed portion 226 may engage with a corresponding protruding portion provided on the upper member 210 to be described below, thereby sealing the inside of the spray chambers against the outside. In addition, a spray slit 224 may be formed at the bottom surface of the lower member 220 which may extend in a longitudinal direction of the lower member 220 to spray condensation water supplied. The spray slit 224 may be arranged at the lower part of the cover plate 140.

Figure 17:
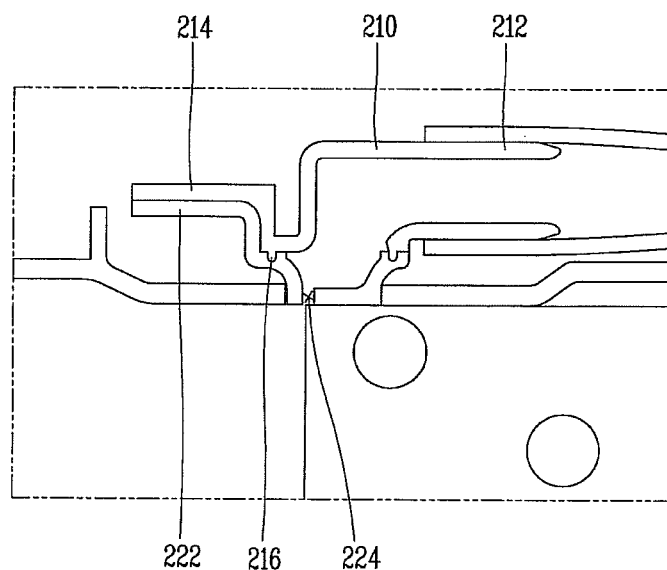
FIG. 17 is a cross-sectional view illustrating an internal structure of the spray nozzle of FIG. 14.

An indentation 218 that is engaged with the partition 228 may be formed inside the upper member 210, and a protruding portion 216 may be formed to face the recessed portion 226. Therefore, as shown in FIG. 17, the recessed portion 226 and the protruding portion 216 may be engaged with each other, thereby preventing leakage of the condensation water from the spray chambers 202. The spray slit 224 may be located at the top of the front surface of the evaporator 121 so that the condensation water sprayed through the spray slit 224 can be sprayed on the front surface of the evaporator 121. In certain embodiments, the spray slit 224 may be positioned away from the front surface of the evaporator 121. In this case, a diffuser may be provided to guide the water to the front surface of the evaporator 121, as previously described with reference to FIG. 11.

Here, one spray slit 224 may be formed along the entire lower member 220. Alternatively, a plurality of spray slits may be formed in each spray chamber. In addition, a plurality of inlet ports may be formed in one spray chamber, or a plurality of spray chambers may share one inlet port.

As embodied and broadly described herein, according to an aspect of the present disclosure, there is provided a clothes treating apparatus which may include a cabinet, a drum provided inside the cabinet, a heat exchanger exchanging heat with air exhausted from the drum, a plurality of spray nozzles spraying water onto a surface of the heat exchanger and space apart from each other, a control valve opening or closing the plurality of spray nozzles, and a controller controlling an operation of the control valve and causing the water to be sprayed sequentially through the plurality of spray nozzles.

In this aspect of the present disclosure, one spray nozzle may not clean the entire area of the heat exchanger, but the heat exchanger may be cleaned using the plurality of spray nozzles. That is, considering that the surface of the heat exchanger does not always need to be clean at a time, when a small amount of condensation water exists, one region of the heat exchanger may be cleaned first in consideration of the remaining amount of condensation water, and another part of the heat exchange is cleaned after a sufficient amount of condensation water is collected, so that cleaning can be carried out even when the remaining amount of condensation water is not sufficient.

In addition, even when the remaining condensation water is sufficient, since condensation water is sprayed onto part of the surface of the heat exchanger, compared to when the entire surface of the heat exchanger is cleaned at a time, a smaller capacity pump can be used. Here, the water may be condensation water generated by the heat exchanger. In some cases, water may be supplied from external supply such as water supply.

Meanwhile, a condensation water collection portion may be provided at a bottom surface of the heat exchanger to collect the condensation water, and a pump may be further provided to supply the condensation water collected in the condensation water collection portion to the control valve. In addition, a condensation water storage portion arranged adjacent to the condensation water collection portion and temporarily storing the condensation water collected in the condensation water collection portion may be provided in a base located at a lower part of the cabinet, and the pump may be installed at the condensation water storage portion.

The clothes treating apparatus may further include water pipes connecting the control valve to the spray nozzles. The control valve may include water supply ports connected to the water pipes, and a draining port may be connected to a draining pipe that drains the condensation water stored in the condensation water storage portion.

Here, the draining pipe may extend from an outside of the cabinet, and may drain unnecessary condensation water to the outside. However, when there is no drainage system at a place where the clothes treating apparatus is installed, a condensation water reservoir may be further provided in the cabinet to store the condensation water, and the draining pipe may communicate with the condensation water reservoir. Therefore, an adequate amount of condensation water may remain in the condensation water storage portion. The condensation water store in the condensation water reservoir may be emptied by a user.

This aspect of the present disclosure may be applicable to an arbitrary clothes treating apparatus having a heat exchanger condensing water exhausted from a drum. In one example, a heat pump including a compressor, a condenser, an expander, and an evaporator may be provided at a bottom surface of the cabinet, and the heat exchanger may correspond to the evaporator.

In addition, a clothes treating apparatus may be divided into an exhaust type clothes treating apparatus in which hot air exhausted from a drum is discharged to the outside of a cabinet and a circulation type clothes treating apparatus in which hot air is condensed, re-heated, and re-supplied to a drum. The present disclosure is applicable to both exhaust type and circulation type.

Both exhaust type and circulation type clothes treating apparatuses include exhaust passages. The evaporator may be provided in a base arranged at a lower part of the cabinet, and a cover plate covering the evaporator and the condenser may be provided to form an exhaust passage together with the base. The condenser may be provided downstream of the evaporator. Air may be re-heated by the condenser and re-supplied to the drum. Here, the spray nozzles may be fixed to the cover plate.

According to another aspect of the present disclosure, there is provided a clothes treating apparatus which may include a heat exchanger condensing air exhausted from a drum, a plurality of spray nozzles spraying water onto a surface of the heat exchange, and a control value sequentially supplying the water to the plurality of spray nozzles, wherein the water is sequentially sprayed onto an entire surface of the heat exchanger.

According to another aspect of the present disclosure, there is provided a cleaning nozzle that spays a fluid onto a surface of a heat exchanger, wherein the cleaning nozzle may include a spray pipe through which a fluid to be sprayed is supplied, and a diffuser having an inlet to which the fluid sprayed from the spray pipe flows and an outlet from which the fluid is sprayed. The outlet may have a width greater than the inlet, wherein part of the spray pipe is inserted into the inlet.

According to another aspect of the present disclosure, there is provided a cleaning nozzle spraying a fluid onto a surface of a heat exchanger, wherein the cleaning nozzle may include a plurality of inlet ports through which a fluid to be sprayed is supplied, a plurality of spray chambers into which the fluid supplied through the inlet ports flows, and a plurality of spray slits respectively formed in the plurality of spray chambers, wherein each of the spray slits is longer than the heat exchanger.

According to the aspects of the present disclosure, even when the remaining condensation water is not sufficient, the heat exchanger can be cleaned in part, thereby preventing reduction in air flow caused by passage resistance. Deterioration in heat release performance of an evaporator of a circulation type clothes treating apparatus in which air re-circulates continuously may affect drying performance and make a heat pump system unstable. Therefore, the surface of the evaporator needs to stay clean at all times. In the aspects of the present disclosure, as compared to the related art, the heat exchanger can be cleaned more frequently, thereby maximizing utility and efficiency. In addition, since a small capacity pump can be used, manufacturing costs can be reduced, and space utilization can be maximized.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry machine comprising:
   a cabinet;
   a drum provided in the cabinet;
   a heat exchanger for heating air to dry laundry in the drum;
   a first conduit formed between the drum and the heat exchanger to guide the air from the drum to the heat exchanger;
   a second conduit formed between the heat exchanger and the drum to guide the air from the heat exchanger to the drum; and
   a control valve to control a flow of water to the heat exchanger and including at least one inlet port and a first and second outlet port; and
   a controller to control the control valve, wherein an area of the heat exchanger is divided into a plurality of regions, a first nozzle is coupled to the first outlet port and provided above a first region of the plurality of regions, a second nozzle is coupled to the second outlet port and provided above a second region of the plurality of regions, and the controller controls the control valve to selectively direct the flow of water only toward the first nozzle through the first outlet and only toward the second nozzle through the second outlet so that the first and second nozzle are opened at different times.

2. The laundry machine of claim 1, further including a third nozzle coupled to a third outlet port of the control valve and provided above a third region of the plurality of regions, wherein the controller sequentially directs the flow of water to the first, second, and third nozzles through the first, second, and third outlets, respectively.

3. The laundry machine of claim 1, further including a third nozzle coupled to a third outlet port of the control valve and provided above a third region of the plurality of regions, wherein the controller selectively directs the flow of water to the first, second, and third nozzles through the first, second, and third outlets, respectively.

4. The laundry machine of claim 1, further including a fourth nozzle coupled to the first outlet port of the control valve and provided above a fourth region of the plurality of regions, wherein the controller directs the flow of water to the first and fourth nozzles through the first outlet port.

5. The laundry machine of claim 4, wherein the first and fourth regions are nonadjacent to each other.

6. The laundry machine of claim 1, further including a fifth nozzle coupled to a fifth outlet port of the control valve and provided above the first region, wherein the controller directs the flow of water to the first and fifth nozzles.

7. The laundry machine of claim 1, wherein the area of the heat exchanger is a front surface of an evaporator that faces the airflow, and at least one of the first or second nozzles are positioned over the evaporator, a first prescribed distance from the front surface of the evaporator in a lateral direction.

8. The laundry machine of claim 7, further including a channel formed between the first or second nozzles and the front surface of the evaporator to stabilize the flow of water, the channel having a width that increases from the nozzle toward the front surface of the evaporator.

9. The laundry machine of claim 8, further including a guide plate positioned a second prescribed distance from the front surface of the evaporator and inclined at a prescribed angle toward the front surface of the evaporator and the channel to deflect the flow of water toward the front surface of the evaporator.

10. The laundry machine of claim 1, wherein at least one of the first or second nozzles have a round opening to discharge the water from the control valve, and further including a diffuser connected to the round opening, the diffuser forming a channel that extends between the nozzle and a corresponding region of the heat exchanger to guide the water to the corresponding region.

11. The laundry machine of claim 1, wherein at least one of the first or second nozzles have a slit to discharge the water from the control valve.

12. The laundry machine of claim 10, wherein the slit is positioned over a corresponding region of the heat exchanger and laterally extends across the corresponding region such that the water is discharged across the corresponding region.

13. The laundry machine of claim 1, wherein at least one of the first or second nozzles includes a spray nozzle assembly having a first water supply port connected to a first hose to the first outlet port of the control valve, a first water chamber connected to the first water supply port, a first spray slit formed on a surface of the chamber and positioned over the first region such that water flows down a first surface of an evaporator, a second water supply port connected to a second hose to the second outlet port of the control valve, a second water chamber connected to the second water supply port, and a second spray slit formed on a surface of the second chamber and positioned over the second region such that water flows down a second surface of the evaporator.

14. The laundry machine of claim 13, wherein the spray nozzle assembly includes an upper cover and a lower cover that corresponds to a shape of the upper cover, the upper cover and the lower cover forming the first and second water chambers.

15. The laundry machine of claim 1, further including a cover plate provided over an evaporator of the heat exchanger, wherein at least one of first or second nozzles is formed integrally to the cover plate.

16. The laundry machine of claim 15, wherein the first and second conduits are connected to a third conduit that guides air through the heat exchanger, wherein the cover plate forms at least a portion of the third conduit.

17. The laundry machine of claim 16, wherein the evaporator and a condenser of the heat exchanger are positioned inside the third conduit and an expander and a compressor of the heat exchanger are positioned outside the third conduit.

18. The laundry machine of claim 1, further comprising a condensation water collection portion formed under an evaporator of the heat exchanger; and a filtering means to filter the condensation water collected in the condensation water collection portion.

19. The laundry machine of claim 18, wherein the filtering means includes a plurality of ribs formed on the condensation water collection portion arranged in at least a row.

20. The laundry machine of claim 1, further comprising a condensation water collection portion formed under an evaporator of the heat exchanger; and a condensation water storage portion to receive the condensation water from the condensation water collection portion and be located lower than the condensation water collection portion.

* * * * *

UNITED STATES PATENT AND TRADEMARK OFFICE
CERTIFICATE OF CORRECTION

PATENT NO. : 8,857,071 B2  
APPLICATION NO. : 13/431390  
DATED : October 14, 2014  
INVENTOR(S) : Junseok Lee, Seonil Heo and Kiwook Jung Page 1 of 1

It is certified that error appears in the above-identified patent and that said Letters Patent is hereby corrected as shown below:

Claims

In Column 14, line 4, the claims reference numeral "10" should read --11--.

Signed and Sealed this  
Fifth Day of January, 2016

Michelle K. Lee  
*Director of the United States Patent and Trademark Office*